US012129448B2

(12) United States Patent
Barros et al.

(10) Patent No.: US 12,129,448 B2
(45) Date of Patent: Oct. 29, 2024

(54) WATER-SOLUBLE UNIT DOSE ARTICLE CONTAINING A CORE/SHELL CAPSULE

(71) Applicant: The Procter & Gamble Company, Cincinnati, OH (US)

(72) Inventors: Andre Martim Barros, Woluwe Saint Etienne (BE); Mariana B. T. Cardoso, Brussels (BE); Johan Smets, Lubbeek (BE); Steven Daryl Smith, Fairfield, OH (US); Pierre Daniel Verstraete, Woluwe St Lambert (BE); Valerie Wong, Mason, OH (US); Robby Renilde François Keuleers, Lippelo (BE)

(73) Assignee: The Procter & Gamble Company, Cincinnati, OH (US)

( * ) Notice: Subject to any disclaimer, the term of this patent is extended or adjusted under 35 U.S.C. 154(b) by 241 days.

(21) Appl. No.: 17/500,979

(22) Filed: Oct. 14, 2021

(65) Prior Publication Data

US 2022/0119745 A1 Apr. 21, 2022

Related U.S. Application Data

(60) Provisional application No. 63/092,519, filed on Oct. 16, 2020.

(51) Int. Cl.
*C11D 17/04* (2006.01)
*C11D 3/37* (2006.01)
*C11D 3/50* (2006.01)

(52) U.S. Cl.
CPC .......... *C11D 17/043* (2013.01); *C11D 3/3753* (2013.01); *C11D 3/50* (2013.01)

(58) Field of Classification Search
None
See application file for complete search history.

(56) References Cited

U.S. PATENT DOCUMENTS 5,500,223 A 3/1996 Behan et al.
6,243,909 B1 6/2001 Graham et al.
6,537,583 B1 3/2003 Dupuis et al.
8,425,940 B2 4/2013 Lapidot et al.
8,931,971 B2 1/2015 Schwarz et al.
9,603,784 B2 3/2017 Shimizu et al.
10,046,291 B2 8/2018 Yamazaki
10,285,928 B2 5/2019 Marsh et al.
2004/0163674 A1 8/2004 Policicchio et al.
2005/0158369 A1 7/2005 Dorschner et al.
2006/0188551 A1 8/2006 Hauser et al.
2008/0096780 A1* 4/2008 Veugelers ................ C11D 3/43 510/405
2009/0247449 A1 10/2009 Burdis
2010/0143422 A1 6/2010 Popplewell et al.
2010/0247660 A1 9/2010 Lei et al.
2011/0104221 A1 5/2011 Galeone et al.
2011/0118161 A1 5/2011 Looft
2011/0152159 A1 6/2011 Labeque
2011/0177951 A1 7/2011 Toledano
2012/0104639 A1 5/2012 Traynor et al.
2012/0128747 A1 5/2012 Veronique et al.
2012/0202695 A1 8/2012 Toledano
2012/0237578 A1 9/2012 Lei
2013/0040817 A1 2/2013 Dreher
2014/0044761 A1 2/2014 Lei et al.
2014/0331414 A1 11/2014 Bone
2014/0338134 A1 11/2014 Fernandez Prieto et al.
2014/0342972 A1 11/2014 Smets
2015/0275142 A1* 10/2015 Hulskotter ........... C11D 17/042 510/320
2016/0168509 A1 6/2016 Hitchcock
2016/0168510 A1 6/2016 Tasker et al.
2016/0168511 A1 6/2016 Hitchcock et al.
2016/0184196 A1 6/2016 Baxter et al.
2016/0303531 A1 10/2016 Yamazaki
2016/0317993 A1 11/2016 Rotello et al.
2018/0085291 A1 3/2018 Sasaki
2018/0207451 A1 7/2018 Toledano
2018/0339176 A1 11/2018 Toledano
2020/0114328 A1 4/2020 Jerri et al.
2020/0129947 A1 4/2020 Ouali et al.
2020/0255776 A1 8/2020 Schmiedel et al.
2020/0330948 A1* 10/2020 Cardoso ................ D06M 23/12
2020/0330949 A1 10/2020 Cardoso et al.
2020/0330950 A1 10/2020 Cardoso et al.
2022/0118417 A1 4/2022 Smith et al.
2022/0119741 A1 4/2022 Smets et al.
2022/0119742 A1 4/2022 Smets et al.

(Continued)

FOREIGN PATENT DOCUMENTS

CA 2980792 A1 2/2010
CN 103432970 A 12/2013
CN 105612248 A 5/2016

(Continued)

OTHER PUBLICATIONS

PCT Search Report and Written Opinion for PCT/US2021/054881 dated Feb. 8, 2022, 11 pages.
All Office Actions; U.S. Appl. No. 17/498,016, filed Oct. 11, 2021.
All Office Actions; U.S. Appl. No. 17/501,202, filed Oct. 14, 2021.
All Office Actions; U.S. Appl. No. 17/727,857, filed Apr. 25, 2022.
All Office Actions; U.S. Appl. No. 18/115,890, filed Mar. 1, 2023.
Unpublished U.S. Appl. No. 18/115,890, filed Mar. 1, 2023, to Mariana B T Cardoso et. al.
Unpublished U.S. Appl. No. 17/500,984, filed Sep. 14, 2021, to Jonathan Robert Cetti et al.
PCT Search Report and Written Opinion for PCT/US2020/028619; dated Jun. 30, 2020, 18 pages.

(Continued)

*Primary Examiner* — Lorna M Douyon
(74) *Attorney, Agent, or Firm* — Christopher I. Meyer; Andrew J. Mueller; Gregory S. Darley-Emerson

(57) ABSTRACT

Water-soluble unit dose article containing a laundry detergent composition containing a capsule having a core and a shell.

19 Claims, 1 Drawing Sheet

(56) References Cited

U.S. PATENT DOCUMENTS

| | | | |
|---|---|---|---|
| 2022/0119743 A1 | 4/2022 | Barros et al. |
| 2022/0258118 A1 | 8/2022 | Cardoso et al. |

FOREIGN PATENT DOCUMENTS

| | | | | |
|---|---|---|---|---|
| CN | 105734540 | A | | 7/2016 |
| CN | 107001979 | A | | 8/2017 |
| CN | 107249545 | B | | 5/2021 |
| EP | 1767613 | A1 | | 3/2007 |
| EP | 1767614 | A1 | | 3/2007 |
| EP | 2078696 | A1 | | 7/2009 |
| EP | 3181674 | A1 | | 6/2017 |
| EP | 2865423 | B1 | | 3/2020 |
| JP | 2010215806 | A | | 9/2010 |
| WO | 0145615 | A1 | | 6/2001 |
| WO | 2005044220 | A1 | | 5/2005 |
| WO | 2007019201 | A1 | | 2/2007 |
| WO | 2009106318 | A2 | | 9/2009 |
| WO | 2011154421 | A1 | | 12/2011 |
| WO | 2013078551 | A1 | | 6/2013 |
| WO | 2013083760 | A2 | | 6/2013 |
| WO | 2013174921 | A1 | | 11/2013 |
| WO | 2016100477 | A1 | | 6/2016 |
| WO | 2016100479 | A1 | | 6/2016 |
| WO | 2017016636 | A1 | | 2/2017 |
| WO | 2017075074 | A1 | | 5/2017 |
| WO | 2018189588 | A1 | | 10/2018 |
| WO | WO 2018/231886 | A1 | * | 12/2018 |
| WO | 2020077451 | A1 | | 4/2020 |
| WO | 2020214876 | A1 | | 10/2020 |
| WO | 2020214877 | A1 | | 10/2020 |
| WO | 2020214878 | A1 | | 10/2020 |

OTHER PUBLICATIONS

PCT Search Report and Written Opinion for PCT/US2020/028621; dated Jul. 7, 2020, 13 pages.
PCT Search Report and Written Opinion for PCT/US2020/028623 ; dated Jul. 21, 2020, 14 pages.
All Office Actions; U.S. Appl. No. 16/851,176, filed Apr. 17, 2020.
All Office Actions; U.S. Appl. No. 16/851,194, filed Apr. 17, 2020.
All Office Actions; U.S. Appl. No. 16/851,173, filed Apr. 17, 2020.
All Office Actions; U.S. Appl. No. 17/500,970, filed Oct. 14, 2021.
All Office Actions; U.S. Appl. No. 17/500,984, filed Oct. 14, 2021.
All Office Actions; U.S. Appl. No. 17/501,186, filed Oct. 14, 2021.
Jyothi et al., "Microencapsulation techniques, factors influencing encapsulation efficiency", Journal of Microencapsulation, 27:3, pp. 187-197, date unknown.
Liu, M.: "Understanding the mechanicalstrength of micro capsules and their adhesion on fabric surfaces",2010, University of Birmingham,XP055511234, cited in the application pp. 86-89 p. 104-p. 106 p. 118.
Thompson et al., "Colloidosomes: Synthesis, properties and applications", Journal of Colloid and Interface Science, 447, 2015, pp. 217-228.
Unpublished U.S. Appl. No. 17/500,970, filed Oct. 14, 2021, to Andre Martim Barros et al.
Unpublished U.S. Appl. No. 17/501,186, filed Oct. 14, 2021, to Srinivas Krishnaswamy Mirle.
All Office Actions; U.S. Appl. No. 18/581,755, filed Feb. 20, 2024.
Unpublished U.S. Appl. No. 18/581,755, filed Feb. 20, 2024, to Jonathan Robert Cetti et al.
All Office Actions; U.S. Appl. No. 18/410,116, filed Jan. 11, 2024.
All Office Actions; U.S. Appl. No. 18/418,649, filed Jan. 22, 2024.
Unpublished U.S. Appl. No. 18/410,116, filed Jan. 11, 2024, to Mariana B. T. Cardoso et al.
Unpublished U.S. Appl. No. 18/418,649, filed Jan. 22, 2024, to Andre Martim Barros et al.

* cited by examiner

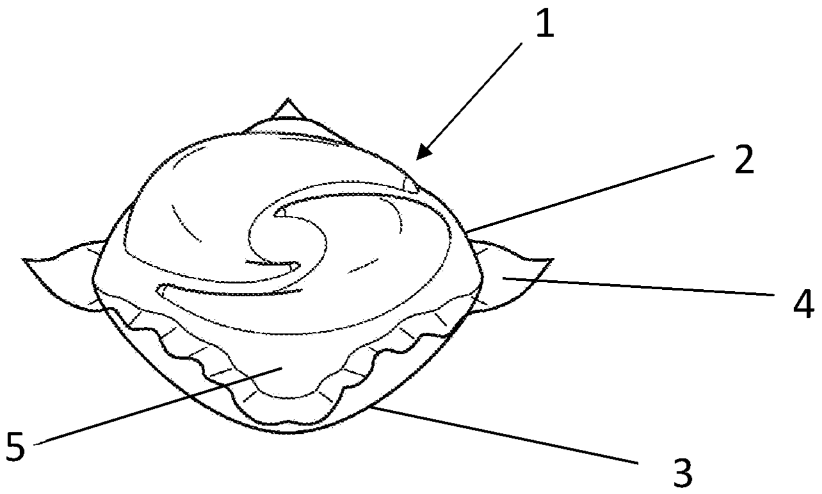
1
2
4
5
3

WATER-SOLUBLE UNIT DOSE ARTICLE CONTAINING A CORE/SHELL CAPSULE

FIELD OF THE INVENTION

Water-soluble unit dose article containing a laundry detergent composition containing a capsule having a core and a shell.

BACKGROUND OF THE INVENTION

Water-soluble unit dose articles are liked by consumers as they are convenient and efficient to use. Such water-soluble unit dose articles often comprise laundry detergent compositions. Without wishing to be bound by theory, when the water-soluble unit dose article is added to water, the film dissolves/disintegrates releasing the internal contents into the surrounding water to create a wash liquor.

Often encapsulated perfume technologies are formulated into the detergent compositions of water-soluble unit dose articles to provide fabric freshness benefits. These encapsulated perfume technologies comprise a core comprising perfume raw materials surrounded by a shell. This shell typically is made from petrochemically derived technologies, such as for example melamine formaldehyde or polyacrylate based technologies. These days, for environmental sustainability reasons, formulators are exploring how to reduce the petrochemically derived content inside of their formulations.

Encapsulated perfume technologies comprising a shell composed mainly of inorganic materials have been proposed in the art as non-petrochemically derived capsule alternatives. However, their fabric freshness performance has been found inferior compared to traditional petrochemically derived capsule technologies within traditional detergent compositions.

Therefore, there is a need for a laundry detergent composition comprising perfume capsules wherein the perfume capsules have a shell with significantly reduced petrochemically derived content, and wherein said laundry detergent composition comprising said capsules exhibits an improved fabric freshness benefit versus known laundry detergent compositions comprising perfume capsules having a shell with significantly reduced petrochemically derived content.

It was surprisingly found that when formulating a laundry detergent composition comprising perfume capsules comprising a shell with significantly reduced petrochemically derived content, wherein the laundry detergent composition is encapsulated inside a polyvinyl alcohol water soluble film, a significantly improved fabric freshness performance was obtained when single variably compared to the same detergent composition in absence of the polyvinyl alcohol water soluble film.

SUMMARY OF THE INVENTION

An aspect of the invention is a water-soluble unit dose article, wherein the water-soluble unit dose article comprises a water-soluble polyvinyl alcohol film and a laundry detergent composition, wherein the water-soluble film encloses the laundry detergent composition, wherein the laundry detergent composition comprises capsules, wherein the capsules have a core and a shell and wherein the shell surrounds the core; wherein the core comprises a hydrophobic material, preferably wherein the hydrophobic material comprises at least one perfume raw material; wherein the shell comprises between 90% and 100% by weight of the shell of an inorganic material.

BRIEF DESCRIPTION OF THE DRAWINGS

FIG. 1 is a water-soluble unit dose article according to the present invention.

DETAILED DESCRIPTION OF THE INVENTION

Water-Soluble Unit Dose Article

The present invention relates to a water-soluble unit dose article comprising a water-soluble polyvinyl alcohol film and a laundry detergent composition, wherein the water-soluble film encloses the laundry detergent composition. The water-soluble polyvinyl alcohol film and the laundry detergent composition are both described in more detail below.

The water-soluble unit dose article comprises the water-soluble film, i.e. the water-soluble polyvinyl alcohol film, shaped such that the unit-dose article comprises at least one internal compartment surrounded by the water-soluble film. The unit dose article may comprise a first water-soluble film and a second water-soluble film sealed to one another such to define the internal compartment. The water-soluble unit dose article is constructed such that the detergent composition does not leak out of the compartment during storage. However, upon addition of the water-soluble unit dose article to water, the water-soluble film dissolves and releases the contents of the internal compartment into the wash liquor.

The compartment should be understood as meaning a closed internal space within the unit dose article, which holds the detergent composition. During manufacture, a first water-soluble film may be shaped to comprise an open compartment into which the detergent composition is added. A second water-soluble film is then laid over the first film in such an orientation as to close the opening of the compartment. The first and second films are then sealed together along a seal region.

The unit dose article may comprise more than one compartment, even at least two compartments, or even at least three compartments, or even at least four compartments. The compartments may be arranged in superposed orientation, i.e. one positioned on top of the other. In such an orientation the unit dose article will comprise at least three films, top, one or more middle, and bottom. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment but does not completely enclose the second compartment. Alternatively, one compartment may be completely enclosed within another compartment.

Wherein the unit dose article comprises at least two compartments, one of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side. The unit dose article may comprise at least four compartments, three of the compartments may be smaller than the fourth compartment, and preferably the smaller compartments are superposed on the larger compartment. The superposed compartments preferably are orientated side-by-side.

In a multi-compartment orientation, the detergent composition according to the present invention may be comprised in at least one of the compartments. It may for example be comprised in just one compartment, or may be comprised in two compartments, or even in three compartments, or even in four compartments.

Each compartment may comprise the same or different compositions. The different compositions could all be in the same form, or they may be in different forms.

The water-soluble unit dose article may comprise at least two internal compartments, wherein the liquid laundry detergent composition is comprised in at least one of the compartments, preferably wherein the unit dose article comprises at least three compartments, wherein the detergent composition is comprised in at least one of the compartments.

FIG. 1 discloses a water-soluble unit dose article (1) according to the present invention. The water-soluble unit dose article (1) comprises a first water-soluble film (2) and a second water-soluble film (3) which are sealed together at a seal region (4). The liquid laundry detergent composition (5) is comprised within the water-soluble soluble unit dose article (1).

Without wishing to be bound by theory, it is believed there is a synergistic effect between polyvinyl alcohol and perfume capsule having inorganic shell materials according to the present invention. This synergistic effect results in improved capsule deposition and retention onto fabrics during the wash and an overall improved fabric freshness performance accordingly, when compared to formulating these perfume capsules having shell materials according to the present invention inside non-water-soluble polyvinyl alcohol film enclosed detergent compositions.

This is even more surprising considering petrochemically derived encapsulated perfume technologies were found to negatively interact with polyvinyl alcohol, leading to a fabric freshness compromise when compared to formulating the capsules with higher petrochemically derived content in detergent compositions, wherein the detergent compositions are not enclosed in a water-soluble polyvinyl alcohol film.

Water-Soluble Film

The film of the present invention is soluble or dispersible in water. The water-soluble film preferably has a thickness of from 20 to 150 micron, preferably 35 to 125 micron, even more preferably 50 to 110 micron, most preferably about 76 micron.

Preferably, the film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are preferably polymeric materials. The film material can, for example, be obtained by casting, blow-moulding, extrusion or blown extrusion of the polymeric material, as known in the art.

The water-soluble film comprises polyvinyl alcohol. Preferably, the water-soluble film comprises at least 50%, preferably at least 60%, by weight of the water-soluble film of polyvinyl alcohol. The water-soluble film may comprise between 50% and 100%, or even between 60% and 99%, by weight of the water-soluble film of polyvinyl alcohol.

Preferably, the water-soluble film comprises polyvinyl alcohol homopolymer or copolymer, preferably a blend of polyvinylalcohol homopolymers and/or polyvinylalcohol copolymers preferably selected from sulphonated and carboxylated anionic polyvinylalcohol copolymers especially carboxylated anionic polyvinylalcohol copolymers, most preferably a blend of a polyvinylalcohol homopolymer and a carboxylated anionic polyvinylalcohol copolymer. Preferably the water-soluble film comprises a polyvinyl alcohol homopolymer or a polyvinyl alcohol copolymer preferably an anionic polyvinyl alcohol copolymer, or a blend of polyvinylalcohol homopolymers and/or polyvinylalcohol copolymers preferably anionic polyvinylalcohol copolymers. More preferably the water-soluble film comprises an anionic polyvinyl alcohol copolymer, even more preferably selected from sulphonated and carboxylated anionic polyvinylalcohol copolymers especially carboxylated anionic polyvinylalcohol copolymers, Most preferably the water soluble film comprises a blend of a polyvinylalcohol homopolymer and a carboxylated anionic polyvinylalcohol copolymer.

Preferred films exhibit good dissolution in cold water, meaning unheated distilled water. Preferably such films exhibit good dissolution at temperatures of 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

Preferred films are those supplied by Monosol under the trade references M8630, M8900, M8779, M8310.

The film may be opaque, transparent or translucent. The film may comprise a printed area.

The area of print may be achieved using standard techniques, such as flexographic printing or inkjet printing.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Preferably, the water-soluble film or water-soluble unit dose article or both are coated in a lubricating agent, preferably, wherein the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Preferably, the water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within water-soluble films and ingredients thereof Laundry Detergent Composition The laundry detergent composition may be any suitable composition. The composition may be in the form of a solid, a liquid, or a mixture thereof.

A solid can be in the form of free flowing particulates, compacted solids or a mixture thereof. It should be understood, that a solid may comprise some water, but is essentially free of water. In other words, no water is intentionally added other than what comes from the addition of various raw materials.

In relation to the laundry detergent composition of the present invention, the term 'liquid' encompasses forms such as dispersions, gels, pastes and the like. The liquid composition may also include gases in suitably subdivided form. The term 'liquid laundry detergent composition' refers to any laundry detergent composition comprising a liquid capable of wetting and treating fabric e.g., cleaning clothing in a domestic washing machine. A dispersion for example is a liquid comprising solid or particulate matter contained therein.

The laundry detergent composition can be used as a fully formulated consumer product, or may be added to one or more further ingredient to form a fully formulated consumer product. The laundry detergent composition may be a 'pre-treat' composition which is added to a fabric, preferably a fabric stain, ahead of the fabric being added to a wash liquor.

The laundry detergent composition comprises capsules and said capsules are described in more detail below.

Preferably, the laundry detergent composition comprises a non-soap surfactant. The non-soap surfactant is preferably selected from non-soap anionic surfactant, non-ionic surfactant or a mixture thereof. Preferably, the laundry detergent composition comprises between 10% and 60%, more preferably between 20% and 55% by weight of the laundry detergent composition of the non-soap surfactant.

Preferably, the anionic non-soap surfactant comprises linear alkylbenzene sulphonate, alkyl sulphate, alkoxylated alkyl sulphate, or a mixture thereof. Preferably, the alkoxylated alkyl sulphate is an ethoxylated alkyl sulphate.

Preferably, the laundry detergent composition comprises between 5% and 60%, preferably between 15% and 55%, more preferably between 25% and 50%, most preferably between 30% and 45% by weight of the detergent composition of the non-soap anionic surfactant.

Preferably, the non-soap anionic surfactant comprises linear alkylbenzene sulphonate and alkoxylated alkyl sulphate, wherein the ratio of linear alkylbenzene sulphonate to alkoxylated alkyl sulphate preferably the weight ratio of linear alkylbenzene sulphonate to ethoxylated alkyl sulphate is from 1:10 to 10:1, preferably from 6:1 to 1:6, more preferably from 4:1 to 1:4, even more preferably from 3:1 to 1:1. Alternatively the weight ratio of linear alkylbenzene sulphonate to ethoxylated alkyl sulphate is from 1:2 to 1:4. The alkoxylated alkyl sulphate can be derived from a synthetic alcohol or a natural alcohol, or from a blend thereof, pending the desired average alkyl carbon chain length and average degree of branching. Preferably, the synthetic alcohol is made following the Ziegler process, OXO-process, modified OXO-process, the Fischer Tropsch process, Guerbet process or a mixture thereof. Preferably, the naturally derived alcohol is derived from natural oils, preferably coconut oil, palm kernel oil or a mixture thereof.

Preferably, the laundry detergent composition comprises between 0% and 15%, preferably between 0.01% and 12%, more preferably between 0.1% and 10%, most preferably between 0.15% and 7% by weight of the laundry detergent composition of a non-ionic surfactant. The non-ionic surfactant is preferably selected from alcohol alkoxylate non-ionic surfactant, including naturally derived alcohol, synthetic derived alcohol based alcohol alkoxylate non-ionic surfactants, and mixtures thereof, pending the desired average alkyl carbon chain length and average degree of branching. The alcohol alkoxylate nonionic surfactant can be a primary or a secondary alcohol alkoxylate nonionic surfactant, preferably a primary alcohol alkoxylate nonionic surfactant. Synthetically derived alcohol alkoxylate non-ionic surfactants include Ziegler-synthesized alcohol alkoxylate, an oxo-synthesized alcohol alkoxylate, a modified oxo-process synthesized alcohol alkoxylate, Fischer-Tropsch synthesized alcohol alkoxylates, Guerbet alcohol alkoxylates, alkyl phenol alcohol alkoxylates, or a mixture thereof. The alkoxylation chain can be a mixed alkoxylation chain comprising ethoxy, propoxy and/or butoxy units, or can be a purely ethoxylated alkyl chain, preferably a purely ethoxylated alkyl chain.

Preferably, the laundry preferably liquid laundry detergent composition comprises between 1.5% and 20%, more preferably between 2% and 15%, even more preferably between 3% and 10%, most preferably between 4% and 8% by weight of the laundry detergent composition of soap, preferably a fatty acid salt, more preferably an amine neutralized fatty acid salt, wherein preferably the amine is an alkanolamine more preferably selected from monoethanolamine, diethanolamine, triethanolamine or a mixture thereof, more preferably monoethanolamine.

Preferably, the laundry detergent composition comprises a non-aqueous solvent, preferably wherein the non-aqueous solvent is selected from ethanol, 1,2-propanediol, dipropylene glycol, tripropyleneglycol, glycerol, sorbitol, ethyleneglycol, polyethylene glycol, polypropylene glycol, or a mixture thereof, preferably wherein the polypropyleneglycol has a molecular weight of 400. Preferably the liquid laundry detergent composition comprises between 10% and 40%, preferably between 15% and 30% by weight of the liquid laundry detergent composition of the non-aqueous solvent. Without wishing to be bound by theory the non-aqueous solvents ensure appropriate levels of film plasticization so the film is not too brittle and not too 'floppy'. Without wishing to be bound by theory, having the correct degree of plasticization will also facilitate film dissolution when exposed to water during the wash process.

Preferably, the liquid laundry detergent composition comprises between 1% and 20%, preferably between 5% and 15% by weight of the liquid laundry detergent composition of water.

Preferably, the laundry detergent composition comprises an ingredient selected from the list comprising cationic polymers, polyester terephthalate polymers, amphiphilic graft copolymers, alkoxylated preferably ethoxylated polyethyleneimine polymers, carboxymethylcellulose, enzymes, bleach or a mixture thereof.

Preferably, the laundry detergent composition comprises non-encapsulated perfume.

The laundry detergent composition may comprise an adjunct ingredient, wherein the adjunct ingredient is selected from hueing dyes, aesthetic dyes, builders preferably citric acid, chelants, cleaning polymers, dispersants, dye transfer inhibitor polymers, fluorescent whitening agent, opacifier, antifoam, preservatives, anti-oxidants, or a mixture thereof. Preferably the chelant is selected from aminocarboxylate chelants, aminophosphonate chelants, or a mixture thereof.

Preferably, the laundry detergent composition has a pH between 6 and 10, more preferably between 6.5 and 8.9, most preferably between 7 and 8, wherein the pH of the laundry detergent composition is measured as a 10% dilution in demineralized water at 20° C.

The liquid laundry detergent composition may be Newtonian or non-Newtonian. Preferably, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition. When Newtonian the composition may have a viscosity value, at a shear rate of 20 s-1 and a temperature of 20° C., of 100 to 3,000 cP, alternatively 200 to 2,000 cP, alternatively 300 to 1,000 cP, following the method described herein. When non-Newtonian, the composition may have a high shear viscosity value, at a shear rate of 20 s-1 and a temperature of 20° C., of 100 to 3,000 cP, alternatively 300 to 2,000 cP, alternatively 500 to 1,000 cP, and a low shear viscosity value, at a shear rate of 1 s-1 and a temperature of 20° C., of 500 to 100,000 cP, alternatively 1000 to 10,000 cP, alternatively 1,300 to 5,000 cP, following the method described herein. Methods to measure viscosity are known in the art. According to the present disclosure, viscosity measurements are carried out using a rotational rheometer e.g. TA instruments AR550. The instrument includes a 40 mm 2° or 1° cone fixture with a gap of around 50-60 μm for isotropic liquids, or a 40 mm flat steel plate with a gap of 1000 μm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 s1, and an equilibration of 60 seconds at the selected temperature. The peak hold involves applying a shear rate of 0.05 s1 at 20° C. for 3 min with sampling every 10 s. The continuous ramp step is performed at a shear rate from 0.1 to 1200 s1 for 3 min at 20° C. to obtain the full flow profile.

Capsules

The laundry detergent composition comprises capsules, wherein the capsules have a core and a shell and wherein the shell surrounds the core.

The laundry detergent composition preferably comprises the capsules in an amount from 0.05% to 20%, more preferably from 0.05% to 10%, even more preferably from 0.1% to 5%, most preferably from 0.2% to 3%, by weight of the laundry detergent composition.

The core comprises a hydrophobic material, preferably the hydrophobic material comprises at least one perfume raw material. The core is described in more detail below.

The laundry detergent composition may comprise perfume comprising capsules as the sole source of perfume raw materials or may comprise perfume comprising capsules in combination with freely added perfume to the laundry detergent composition. The laundry detergent composition may comprise a sufficient amount of capsules to provide from about 0.05% to about 10%, or from about 0.1% to about 5%, or from about 0.1% to about 3%, by weight of the laundry detergent composition, of perfume raw materials to the laundry detergent composition. When discussing herein the amount or weight percentage of the capsules, it is meant the sum of the shell material and the core material.

The capsules can have a mean shell thickness of 10 nm to 10,000 nm, preferably 170 nm to 1000 nm, more preferably 300 nm to 500 nm.

The capsules can have a mean volume weighted capsule diameter of 0.1 micrometers to 300 micrometers, preferably 10 micrometers to 200 micrometers, more preferably 10 micrometers to 50 micrometers. It has been advantageously found that large capsules (e.g., mean diameter of 10 μm or greater) can be provided in accordance with embodiments herein without sacrificing the stability of the capsules as a whole and/or while maintaining good fracture strength.

It has surprisingly been found that in addition to the inorganic shell, the volumetric core-shell ratio can play a role to ensure the physical integrity of the capsules. Shells that are too thin vs. the overall size of the capsule (core:shell ratio >98:2) tend to suffer from a lack of self-integrity. On the other hand, shells that are extremely thick vs. the diameter of the capsule (core:shell ratio <80:20) tend to have higher shell permeability in a surfactant-rich matrix. While one might intuitively think that a thick shell leads to lower shell permeability (since this parameter impacts the mean diffusion path of the active across the shell), it has surprisingly been found that the capsules of this invention that have a shell with a thickness above a threshold have higher shell permeability. It is believed that this upper threshold is, in part, dependent on the capsule diameter. Volumetric core-shell ratio is determined according to the method provided in the Test Method section below.

The capsules may have a volumetric core-shell ratio of 50:50 to 99:1, preferably from 60:40 to 99:1, preferably 70:30 to 98:2, more preferably 80:20 to 96:4.

It may be desirable to have particular combinations of these capsule characteristics. For example, the capsules can have a volumetric core-shell ratio of about 99:1 to about 50:50, and have a mean volume weighted capsule diameter of about 0.1 μm to about 200 μm, and a mean shell thickness of about 10 nm to about 10,000 nm. The capsules can have a volumetric core-shell ratio of about 99:1 to about 50:50, and have a mean volume weighted capsule diameter of about 10 μm to about 200 μm, and a mean shell thickness of about 170 nm to about 10,000 nm. The capsules can have a volumetric core-shell ratio of about 98:2 to about 70:30, and have a mean volume weighted capsule diameter of about 10 μm to about 100 μm, and a mean shell thickness of about 300 nm to about 1000 nm.

Methods according to the present disclosure can produce capsule having a low coefficient of variation of capsule diameter. Control over the distribution of size of the capsules can beneficially allow for the population to have improved and more uniform fracture strength. A population of capsules can have a coefficient of variation of capsule diameter of 40% or less, preferably 30% or less, more preferably 20% or less.

For capsules containing a core material to perform and be cost-effective in consumer goods applications, such as liquid detergent or liquid fabric softener, they should: i) be resistant to core diffusion during the shelf life of the liquid product (e.g., low leakage or permeability); ii) have ability to deposit on the targeted surface during application (e.g. washing machine cycle) and iii) be able to release the core material by mechanical shell rupture at the right time and place to provide the intended benefit for the end consumer.

The capsules described herein can have an average fracture strength of 0.1 MPa to 10 MPa, preferably 0.25 MPa to 5 MPa, more preferably 0.25 MPa to 3 MPa. Fully inorganic capsules have traditionally had poor fracture strength, whereas for the capsules described herein, the fracture strength of the capsules can be greater than 0.25 MPa, providing for improved stability and a triggered release of the benefit agent upon a designated amount of rupture stress.

The core may be oil-based, or the core may be aqueous. Preferably, the core is oil-based. The core may be a liquid at the temperature at which it is utilized in a formulated product. The core may be a liquid at and around room temperature.

The core preferably includes a perfume raw material. The core may comprise from about 1 wt % to 100 wt % perfume, based on the total weight of the core. Preferably, the core can include 50 wt % to 100 wt % perfume based on the total weight of the core, more preferably 80 wt % to 100 wt % perfume based on the total weight of the core. Typically, higher levels of perfume are preferred for improved delivery efficiency.

The perfume raw material may comprise one or more, preferably two or more, perfume raw materials. The term "perfume raw material" (or "PRM") as used herein refers to compounds having a molecular weight of at least about 100 g/mol and which are useful in imparting an odor, fragrance, essence, or scent, either alone or with other perfume raw materials. Typical PRMs comprise inter alia alcohols, ketones, aldehydes, esters, ethers, nitrites and alkenes, such as terpene.

The PRMs may be characterized by their boiling points (B.P.) measured at the normal pressure (760 mm Hg), and their octanol/water partitioning coefficient (P), which may be described in terms of log P, determined according to the test method described in Test methods section. Based on these characteristics, the PRMs may be categorized as Quadrant I, Quadrant II, Quadrant III, or Quadrant IV perfumes, as described in more detail below. A perfume having a variety of PRMs from different quadrants may be desirable, for example, to provide fragrance benefits at different touchpoints during normal usage.

Perfume raw materials having a boiling point B.P. lower than about 250° C. and a log P lower than about 3 are known as Quadrant I perfume raw materials. Quadrant 1 perfume raw materials are preferably limited to less than 30% of the perfume composition. Perfume raw materials having a B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, perfume raw materials having a B.P. lower than about 250° C. and a log P greater than about 3 are known as a Quadrant III perfume raw materials.

Preferably the capsule comprises a perfume. Preferably, the perfume of the capsule comprises a mixture of at least 3, or even at least 5, or at least 7 perfume raw materials. The perfume of the capsule may comprise at least 10 or at least 15 perfume raw materials. A mixture of perfume raw materials may provide more complex and desirable aesthetics, and/or better perfume performance or longevity, for example at a variety of touchpoints. However, it may be desirable to limit the number of perfume raw materials in the perfume to reduce or limit formulation complexity and/or cost.

The perfume may comprise at least one perfume raw material that is naturally derived. Such components may be desirable for sustainability/environmental reasons. Naturally derived perfume raw materials may include natural extracts or essences, which may contain a mixture of PRMs. Such natural extracts or essences may include orange oil, lemon oil, rose extract, lavender, musk, patchouli, balsamic essence, sandalwood oil, pine oil, cedar, and the like.

The core may comprise, in addition to perfume raw materials, a pro-perfume, which can contribute to improved longevity of freshness benefits. Pro-perfumes may comprise nonvolatile materials that release or convert to a perfume material as a result of, e.g., simple hydrolysis, or may be pH-change-triggered pro-perfumes (e.g. triggered by a pH drop) or may be enzymatically releasable pro-perfumes, or light-triggered pro-perfumes. The pro-perfumes may exhibit varying release rates depending upon the pro-perfume chosen.

The core of the encapsulates of the present disclosure may comprise a core modifier, such as a partitioning modifier and/or a density modifier. The core may comprise, in addition to the perfume, from greater than 0% to 80%, preferably from greater than 0% to 50%, more preferably from greater than 0% to 30% based on total core weight, of a core modifier. The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or consist of isopropyl myristate. The modified vegetable oil may be esterified and/or brominated. The modified vegetable oil may preferably comprise castor oil and/or soy bean oil.

The shell comprises between 90% and 100%, preferably between 95% and 100%, more preferably between 99% and 100% by weight of the shell of an inorganic material. Preferably, the inorganic material in the shell comprises a material selected from metal oxide, semi-metal oxides, metals, minerals or mixtures thereof. Preferably, the inorganic material in the shell comprises materials selected from $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, copper or a mixture thereof. More preferably, the inorganic material in the shell comprises a material selected from $SiO_2$, $TiO_2$, $Al_2O_3$, $CaCO_3$, or mixtures thereof, most preferably $SiO_2$.

The shell may include a first shell component. The shell may preferably include a second shell component that surrounds the first shell component. The first shell component can include a condensed layer formed from the condensation product of a precursor. As described in detail below, the precursor can include one or more precursor compounds. The first shell component can include a nanoparticle layer. The second shell component can include inorganic materials.

The inorganic shell can include a first shell component comprising a condensed layer surrounding the core and may further comprise a nanoparticle layer surrounding the condensed layer. The inorganic shell may further comprise a second shell component surrounding the first shell component. The first shell component comprises inorganic materials, preferably metal/semi-metal oxides, more preferably SiO2, TiO2 and Al2O3, or mixture thereof, and even more preferably SiO2. The second shell component comprises inorganic material, preferably comprising materials from the groups of Metal/semi-metal oxides, metals and minerals, more preferably materials chosen from the list of $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, and copper, or mixture thereof, even more preferably chosen from $SiO_2$ and $CaCO_3$ or mixture thereof. Preferably, the second shell component material is of the same type of chemistry as the first shell component in order to maximize chemical compatibility.

The first shell component can include a condensed layer surrounding the core. The condensed layer can be the condensation product of one or more precursors. The one or more precursors may comprise at least one compound from the group consisting of Formula (I), Formula (II), and a mixture thereof, wherein Formula (I) is $(M^vO_zY_n)_w$, and wherein Formula (II) is $(M^vO_zY_nR^1_p)_w$. It may be preferred that the precursor comprises only Formula (I) and is free of compounds according to Formula (II), for example so as to reduce the organic content of the capsule shell (i.e., no $R^1$ groups). Formulas (I) and (II) are described in more detail below.

The one or more precursors can be of Formula (I):

$(M^vO_zY_n)_w$ (Formula I), where M is one or more of silicon, titanium and aluminum, v is the valence number of M and is 3 or 4, z is from 0.5 to 1.6, preferably 0.5 to 1.5, each Y is independently selected from —OH, —$OR^2$, —$NH_2$, —$NHR^2$, —$N(R^2)_2$, wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0.7 to (v−1), and w is from 2 to 2000.

The one or more precursors can be of Formula (I) where M is silicon. It may be that Y is —$OR^2$. It may be that n is 1 to 3. It may be preferable that Y is —$OR^2$ and n is 1 to 3. It may be that n is at least 2, one or more of Y is —$OR^2$, and one or more of Y is —OH.

$R^2$ may be $C_1$ to $C_{20}$ alkyl. $R^2$ may be $C_6$ to $C_{22}$ aryl. $R^2$ may be one or more of $C_1$ alkyl, $C_2$ alkyl, $C_3$ alkyl, $C_4$ alkyl, $C_5$ alkyl, $C_6$ alkyl, $C_7$ alkyl, and $C_8$ alkyl. $R^2$ may be $C_1$ alkyl. $R^2$ may be $C_2$ alkyl. $R^2$ may be $C_3$ alkyl. $R^2$ may be $C_4$ alkyl.

It may be that z is from 0.5 to 1.3, or from 0.5 to 1.1, 0.5 to 0.9, or from 0.7 to 1.5, or from 0.9 to 1.3, or from 0.7 to 1.3.

It may be preferred that M is silicon, v is 4, each Y is —$OR^2$, n is 2 and/or 3, and each $R^2$ is $C_2$ alkyl.

The precursor can include polyalkoxysilane (PAOS). The precursor can include polyalkoxysilane (PAOS) synthesized via a hydrolytic process.

The precursor can alternatively or further include one or more of a compound of Formula (II):

$(M^vO_zY_nR^1_p)_w$ (Formula II), where M is one or more of silicon, titanium and aluminum, v is the valence number of M and is 3 or 4, z is from 0.5 to 1.6, preferably 0.5 to 1.5, each Y is independently selected from —OH, —$OR^2$, —$NH_2$, —$NHR^2$, —$N(R^2)_2$, wherein $R^2$ is selected from a $C_1$ to $C_{20}$ alkyl, $C_1$ to $C_2o$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S; n is from 0 to (v−1); each $R^1$ is independently selected from the group consisting of: a $C_1$ to $C_{30}$ alkyl; a $C_1$ to $C_{30}$ alkylene; a $C_1$ to $C_{30}$ alkyl substituted with a member (e.g., one or more) selected from the group consisting of a halogen, —$OCF_3$, —$NO_2$, —CN, —NC, —OH, —OCN, —NCO, alkoxy, epoxy, amino, mercapto, acryloyl, —C(O)OH, —C(O)O-alkyl, —C(O)O-aryl, —C(O)O-heteroaryl, and mixtures thereof; and a $C_1$ to $C_{30}$ alkylene substituted with a member selected from the group consisting of a halogen, —$OCF_3$, —$NO_2$, —CN, —NC, —OH, —OCN, —NCO, alkoxy, epoxy, amino, mercapto, acryloyl, —C(O)OH, —C(O)O-alkyl, —C(O)O-aryl, and —C(O)O-heteroaryl; and p is a number that is greater than zero and is up to pmax, where $pmax=60/[9*Mw(R^1)+8]$, where $Mw(R^1)$ is the molecular weight of the $R^1$ group, and where w is from 2 to 2000.

$R^1$ may be a $C_1$ to $C_{30}$ alkyl substituted with one to four groups independently selected from a halogen, —$OCF_3$, —$NO_2$, —CN, —NC, —OH, —OCN, —NCO, alkoxy, epoxy, amino, mercapto, acryloyl, $CO_2H$ (ie, C(O)OH), —C(O)O-alkyl, —C(O)O-aryl, and —C(O)O-heteroaryl. $R^1$ may be a $C_1$ to $C_{30}$ alkylene substituted with one to four groups independently selected from a halogen, —$OCF_3$, —$NO_2$, —CN, —NC, —OH, —OCN, —NCO, alkoxy, epoxy, amino, mercapto, acryloyl, $CO_2H$, —C(O)O-alkyl, —C(O)O-aryl, and —C(O)O-heteroaryl.

As indicated above, to reduce or even eliminate organic content in the first shell component, it may be preferred to reduce, or even eliminate, the presence of compounds according to Formula (II), which has R1 groups. The precursor, the condensed layer, the first shell component, and/or the shell may be free of compounds according to Formula (II).

The precursors of formula (I) and/or (II) may be characterized by one or more physical properties, namely a molecular weight (Mw), a degree of branching (DB) and a polydispersity index (PDI) of the molecular weight distribution. It is believed that selecting particular Mw and/or DB can be useful to obtain capsules that hold their mechanical integrity once left drying on a surface and that have low shell permeability in surfactant-based matrices. The precursors of formula (I) and (II) may be characterized as having a DB between 0 and 0.6, preferably between 0.1 and 0.5, more preferably between 0.19 and 0.4, and/or a Mw between 600 Da and 100000 Da, preferably between 700 Da and 60000 Da, more preferably between 1000 Da and 30000 Da. The characteristics provide useful properties of said precursor in order to obtain capsules of the present invention. The precursors of formula (I) and/or (II) can have a PDI between 1 and 50.

The condensed layer comprising metal/semi-metal oxides may be formed from the condensation product of a precursor comprising at least one compound of formula (I) and/or at least one compound of formula (II), optionally in combination with one or more monomeric precursors of metal/semi-metal oxides, wherein said metal/semi-metal oxides comprise $TiO_2$, Al2O3 and SiO2, preferably SiO2. The monomeric precursors of metal/semi-metal oxides may include compounds of the formula $M(Y)_{V-n}R_n$ wherein M, Y and R are defined as in formula (II), and n can be an integer between 0 and 3. The monomeric precursor of metal/semi-metal oxides may be preferably of the form where M is Silicon wherein the compound has the general formula $Si(Y)_{4-n}R_n$ wherein Y and R are defined as for formula (II) and n can be an integer between 0 and 3. Examples of such monomers are TEOS (tetraethoxy orthosilicate), TMOS (tetramethoxy orthosilicate), TBOS (tetrabutoxy orthosilicate), triethoxymethylsilane (TEMS), diethoxy-dimethylsilane (DEDMS), trimethylethoxysilane (TMES), and tetraacetoxysilane (TAcS). These are not meant to be limiting the scope of monomers that can be used and it would be apparent to the person skilled in the art what are the suitable monomers that can be used in combination herein.

The first shell components can include an optional nanoparticle layer. The nanoparticle layer comprises nanoparticles. The nanoparticles of the nanoparticle layer can be one or more of $SiO_2$, $TiO_2$, $Al_2O_3$, $ZrO_2$, $ZnO_2$, $CaCO_3$, clay, silver, gold, and copper. Preferably, the nanoparticle layer can include $SiO_2$ nanoparticles.

The nanoparticles can have an average diameter between 1 nm and 500 nm, preferably between 50 nm and 400 nm.

The pore size of the capsules can be adjusted by varying the shape of the nanoparticles and/or by using a combination of different nanoparticle sizes. For example, non-spherical irregular nanoparticles can be used as they can have improved packing in forming the nanoparticle layer, which is believed to yield denser shell structures. This can be advantageous when limited permeability is required. The nanoparticles used can have more regular shapes, such as spherical. Any contemplated nanoparticle shape can be used herein.

The nanoparticles can be substantially free of hydrophobic modifications. The nanoparticles can be substantially free of organic compound modifications. The nanoparticles can include an organic compound modification. The nanoparticles can be hydrophilic.

The nanoparticles can include a surface modification such as but not limited to linear or branched $C_1$ to $C_{20}$ alkyl groups, surface amino groups, surface methacrylo groups, surface halogens, or surface thiols. These surface modifications are such that the nanoparticle surface can have covalently bound organic molecules on it. When it is disclosed in this document that inorganic nanoparticles are used, this is meant to include any or none of the aforementioned surface modifications without being explicitly called out.

The capsules of the present disclosure may be defined as comprising a substantially inorganic shell comprising a first shell component and a second shell component. By substantially inorganic it is meant that the first shell component can comprise up to 10 wt %, or up to 5 wt % of organic content, preferably up to 1 wt % of organic content, as defined later in the organic content calculation. It may be preferred that the first shell component, the second shell component, or both comprises no more than about 5 wt %, preferably no more than about 2 wt %, more preferably about 0 wt %, of organic content, by weight of the first or shell component, as the case may be.

While the first shell component is useful to build a mechanically robust scaffold or skeleton, it can also provide low shell permeability in liquid products containing surfactants such as laundry detergents, shower-gels, cleansers, etc. (see Surfactants in Consumer Products, J. Falbe, Springer-Verlag). The second shell component can greatly reduce the shell permeability which improves the capsule impermeability in surfactant-based matrices. A second shell component can also greatly improve capsule mechanical properties, such as a capsule rupture force and fracture strength. Without intending to be bound by theory, it is believed that a second shell component contributes to the densification of the overall shell by depositing a precursor in pores remaining in the first shell component. A second shell component also adds an extra inorganic layer onto the surface of the capsule. These improved shell permeabilities and mechanical properties provided by the $2^{nd}$ shell component only occur when used in combination with the first shell component as defined in this invention.

Capsules of the present disclosure may be formed by first admixing a hydrophobic material with any of the precursors of the condensed layer as defined above, thus forming the oil phase, wherein the oil phase can include an oil-based and/or oil-soluble precursor. Said precursor/hydrophobic material mixture is then either used as a dispersed phase or as a continuous phase in conjunction with a water phase, where in the former case an O/W (oil-in-water) emulsion is formed and in the latter a W/O (water-in-oil) emulsion is formed once the two phases are mixed and homogenized via methods that are known to the person skilled in the art. Preferably, an O/W emulsion is formed. Nanoparticles can be present in the water phase and/or the oil phase, irrespective of the type of emulsion that is desired. The oil phase can include an oil-based core modifier and/or an oil-based benefit agent and a precursor of the condensed layer. Suitable core materials to be used in the oil phase are described earlier in this document.

Once either emulsion is formed, the following steps may occur:

(a) the nanoparticles migrate to the oil/water interface, thus forming the nanoparticle layer.

(b) The precursor of the condensed layer comprising precursors of metal/semi-metal oxides will start undergoing a hydrolysis/condensation reaction with the water at the oil/water interface, thus forming the condensed layer surrounded by the nanoparticle layer. The precursors of the condensed layer can further react with the nanoparticles of the nanoparticle layer.

The precursor forming the condensed layer can be present in an amount between 1 wt % and 50 wt %, preferably between 10 wt % and 40 wt % based on the total weight of the oil phase.

The oil phase composition can include any compounds as defined in the core section above. The oil phase, prior to emulsification, can include between 10 wt % to about 99 wt % benefit agent.

In the method of making capsules according to the present disclosure, the oil phase may be the dispersed phase, and the continuous aqueous (or water) phase can include water, an acid or base, and nanoparticles. The aqueous (or water) phase may have a pH between 1 and 11, preferably between 1 and 7 at least at the time of admixing both the oil phase and the aqueous phase together. The acid can be a strong acid. The strong acid can include one or more of HCl, $HNO_3$, $H_2SO_4$, HBr, HI, $HClO_4$, and $HClO_3$, preferably HCl. The acid can be a weak acid. The weak acid can be acetic acid or HF. The concentration of the acid in the continuous aqueous phase can be between $10^{-7}$ M and 5M. The base can be a mineral or organic base, preferably a mineral base. The mineral base can be a hydroxide, such as sodium hydroxide and ammonia. For example, the mineral base can be about $10^{-5}$M to 0.01M NaOH, or about $10^{-5}$M to about 1M ammonia. The list of acids and bases and their concentration ranges exemplified above is not meant to be limiting the scope of the invention, and other suitable acids and bases that allow for the control of the pH of the continuous phase are contemplated herein.

In the method of making the capsules according to the present disclosure, the pH can be varied throughout the process by the addition of an acid and/or a base. For example, the method can be initiated with an aqueous phase at an acidic or neutral pH and then a base can be added during the process to increase the pH. Alternatively, the method can be initiated with an aqueous phase at a basic or neutral pH and then an acid can be added during the process to decrease the pH. Still further, the method can be initiated with an aqueous phase at an acid or neutral pH and an acid can be added during the process to further reduce the pH. Yet further the method can be initiated with an aqueous phase at a basic or neutral pH and a base can be added during the process to further increase the pH. Any suitable pH shifts can be used. Further any suitable combinations of acids and bases can be used at any time in the method to achieve a desired pH. Any of the nanoparticles described above can be used in the aqueous phase. The nanoparticles can be present in an amount of about 0.01 wt % to about 10 wt % based on the total weight of the aqueous phase.

The method can include admixing the oil phase and the aqueous phase in a ratio of oil phase to aqueous phase of about 1:10 to about 1:1.

The second shell component can be formed by admixing capsules having the first shell component with a solution of second shell component precursor. The solution of second shell component precursor can include a water soluble or oil soluble second shell component precursor. The second shell component precursor can be one or more of a compound of formula (I) as defined above, tetraethoxysilane (TEOS), tetramethoxysilane (TMOS), tetrabutoxysilane (TBOS), triethoxymethylsilane (TEMS), diethoxy-dimethylsilane (DEDMS), trimethylethoxysilane (TMES), and tetraacetoxysilane (TAcS). The second shell component precursor can also include one or more of silane monomers of type $Si(Y)_{4-n}R_n$ wherein Y is a hydrolysable group, R is a non-hydrolysable group, and n can be an integer between 0 and 3. Examples of such monomers are given earlier in this paragraph, and these are not meant to be limiting the scope of monomers that can be used. The second shell component precursor can include salts of silicate, titanate, aluminate, zirconate and/or zincate. The second shell component precursor can include carbonate and calcium salts. The second shell component precursor can include salts of iron, silver, copper, nickel, and/or gold. The second shell component precursor can include zinc, zirconium, silicon, titanium, and/or aluminum alkoxides. The second shell component precursor can include one or more of silicate salt solutions such as sodium silicates, silicon tetralkoxide solutions, iron sulfate salt and iron nitrate salt, titanium alkoxides solutions, aluminum trialkoxide solutions, zinc dialkoxide solutions, zirconium alkoxide solutions, calcium salt solution, carbonate salt solution. A second shell component comprising $CaCO_3$ can be obtained from a combined use of calcium salts and carbonate salts. A second shell component comprising $CaCO_3$ can be obtained from Calcium salts without addition of carbonate salts, via in-situ generation of carbonate ions from $CO_2$.

The second shell component precursor can include any suitable combination of any of the foregoing listed compounds.

The solution of second shell component precursor can be added dropwise to the capsules comprising a first shell component. The solution of second shell component precursor and the capsules can be mixed together between 1 minute and 24 hours. The solution of second shell component precursor and the capsules can be mixed together at room temperature or at elevated temperatures, such as 20° C. to 100° C.

The second shell component precursor solution can include the second shell component precursor in an amount between 1 wt % and 50 wt % based on the total weight of the solution of second shell component precursor Capsules with a first shell component can be admixed with the solution of the second shell component precursor at a pH of between 1 and 11. The solution of the second shell precursor can contain an acid and/or a base. The acid can be a strong acid. The strong acid can include one or more of HCl, $HNO_3$, $H_2SO_4$, HBr, HI, $HClO_4$, and $HClO_3$, preferably HCl. In other embodiments, the acid can be a weak acid. In embodiments, said weak acid can be acetic acid or HF. The concentration of the acid in the second shell component precursor solution can be between $10^{-7}$ M and 5M. The base can be a mineral or organic base, preferably a mineral base. The mineral base can be a hydroxide, such as sodium hydroxide and ammonia. For example, the mineral base can be about $10^{-5}$M to 0.01M NaOH, or about $10^{-5}$M to about 1M ammonia. The list of acids and bases exemplified above is not meant to be limiting the scope of the invention, and other suitable acids and bases that allow for the control of the pH of the second shell component precursor solution are contemplated herein.

The process of forming a second shell component can include a change in pH during the process. For example, the process of forming a second shell component can be initiated at an acidic or neutral pH and then a base can be added during the process to increase the pH. Alternatively, the process of forming a second shell component can be initiated at a basic or neutral pH and then an acid can be added during the process to decrease the pH. Still further, the process of forming a second shell component can be initiated at an acid or neutral pH and an acid can be added during the process to further reduce the pH. Yet further the process of forming a second shell component can be initiated at a basic or neutral pH and a base can be added during the process to further increase the pH. Any suitable pH shifts can be used. Further any suitable combinations of acids and bases can be used at any time in the solution of second shell component precursor to achieve a desired pH. The process of forming a second shell component can include maintaining a stable pH during the process with a maximum deviation of +/−0.5 pH unit. For example, the process of forming a second shell component can be maintained at a basic, acidic or neutral pH. Alternatively, the process of forming a second shell component can be maintained at a specific pH range by controlling the pH using an acid or a base. Any suitable pH range can be used. Further any suitable combinations of acids and bases can be used at any time in the solution of second shell component precursor to keep a stable pH at a desirable range.

Whether making an oil-based core or aqueous core, the emulsion can be cured under conditions to solidify the precursor thereby forming the shell surrounding the core.

The reaction temperature for curing can be increased in order to increase the rate at which solidified capsules are obtained. The curing process can induce condensation of the precursor. The curing process can be done at room temperature or above room temperature. The curing process can be done at temperatures 30° C. to 150° C., preferably 50° C. to 120° C., more preferably 80° C. to 100° C. The curing process can be done over any suitable period to enable the capsule shell to be strengthened via condensation of the precursor material. The curing process can be done over a period from 1 minute to 45 days, preferably 1 hour to 7 days, more preferably 1 hour to 24 hours. Capsules are considered cured when they no longer collapse. Determination of capsule collapse is detailed below. During the curing step, it is believed that hydrolysis of Y moieties (from formula (I) and/or (II)) occurs, followed by the subsequent condensation of a —OH group with either another —OH group or another moiety of type Y (where the 2 Y moieties are not necessarily the same). The hydrolysed precursor moieties will initially condense with the surface moieties of the nanoparticles (provided they contain such moieties). As the shell formation progresses, the precursor moieties will react with said preformed shell.

The emulsion can be cured such that the shell precursor undergoes condensation. The emulsion can be cured such that the shell precursor reacts with the nanoparticles to undergo condensation. Shown below are examples of the hydrolysis and condensation steps described herein for silica-based shells:

Hydrolysis: ≡Si—OR+$H_2O$→≡Si—OH+ROH

Condensation: ≡Si—OH+≡Si—OR→≡Si—O—Si≡+ROH

≡Si—OH+≡Si—OH→≡Si—O—Si≡+$H_2O$.

For example, when a precursor of formula (I) or (II) is used, the following describes the hydrolysis and condensation steps:

Hydrolysis: ≡M-Y+$H_2O$→≡M-OH+YH

Condensation: ≡M-OH+≡M-Y→≡M-O-M≡+YH

≡M-OH+≡M-OH→≡M-O-M≡+$H_2O$.

The capsules may be provided as a slurry composition (or simply "slurry" herein). The result of the methods described herein may be a slurry containing the capsules. The slurry can be formulated into a product, such as a consumer product.

Method of Making the Water-Soluble Unit Dose Article

Those skilled in the art will be aware of known techniques and methods to make the liquid laundry detergent composition and the water-soluble unit dose article.

Process of Use

A further aspect of the present invention is a process of laundering fabrics comprising the steps of diluting between 200 and 3000 fold, preferably between 300 and 2000 fold, the water-soluble unit dose article according to the present invention with water to make a wash liquor, contacting fabrics to be treated with the wash liquor.

The wash liquor may comprise water of any hardness preferably varying between 0 gpg to 40 gpg.

Preferably the wash solution comprises between 0.01 and 100 ppm, preferably between 0.1 and 10 ppm of the polyvinyl alcohol, and between 1 and 1000 ppm preferably between 10 and 100 ppm of the capsules. The capsules and the polyvinyl alcohol are preferably in a weight ratio of from 1:1 to 100:1, preferably from 10:1 to 50:1 in the wash solution.

Combinations

A. A water-soluble unit dose article, wherein the water-soluble unit dose article comprises a water-soluble polyvinyl alcohol film and a laundry detergent composition, wherein the water-soluble film encloses the laundry detergent composition, wherein the laundry detergent composition comprises capsules, wherein the capsules have a core and a shell and wherein the shell surrounds the core;
 wherein the core comprises a hydrophobic material, preferably wherein the hydrophobic material comprises at least one perfume raw material;
 wherein the shell comprises between 90% and 100%, preferably between 95% and 100%, more preferably between 99% and 100% by weight of the shell of an inorganic material.

B. A water-soluble unit dose article according to paragraph A wherein the inorganic material in the shell comprises a material selected from metal oxide, semi-metal oxides, metals, minerals or mixtures thereof, preferably materials selected from $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, copper or a mixture thereof, more preferably selected from $SiO_2$, $TiO_2$, $Al_2O_3$, $CaCO_3$, or mixtures thereof, most preferably $SiO_2$.

C. A water-soluble unit dose article according to paragraphs A or B wherein the shell comprises (a) a first shell component comprising a condensed layer and a nanoparticle layer, where the condensed layer comprises a condensation product of a precursor, and where the nanoparticle layer comprises inorganic nanoparticles, and where the condensed layer is disposed between the core and the nanoparticle layer, and (b) a second shell component surrounding the first shell component, where the second shell component surrounds the nanoparticle layer.

D. A water-soluble unit dose article according to any of paragraphs A-C, wherein the capsules are characterized by one or more of the following:
 (a) a mean volume weighted capsule diameter of 10 μm to 200 μm, preferably 10 μm to 190 μm;
 (b) an average shell thickness of 170 nm to 1000 nm;
 (c) a volumetric core/shell ratio of from about 50:50 to 99:1, preferably 60:40 to 99:1, more preferably 70:30 to 98:2, even more preferably 80:20 to 96:4;
 (d) the first shell component comprises no more than 5 wt %, preferably no more than 2 wt %, more preferably 0 wt %, of organic content, by weight of the first shell component; or
 (e) a mixture thereof.

E. A water-soluble unit dose article according to paragraphs C-D wherein the precursor comprises at least one compound selected from the group consisting of Formula (I), Formula (II), or a mixture thereof,
 wherein Formula (I) is $(M^vO_zY_n)_w$,
 wherein Formula (II) is $(M^vO_zY_nR^1_p)_w$,
 wherein for Formula (I), Formula (II), or the mixture thereof:
 each M is independently selected from the group consisting of silicon, titanium, and aluminum,
 v is the valence number of M and is 3 or 4,
 z is from 0.5 to 1.6,
 each Y is independently selected from —OH, —$OR^2$, halogen,

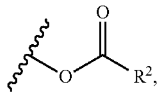

$NH_2$, —$NHR^2$, —$N(R^2)_2$, and

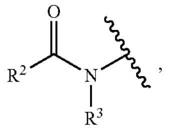

wherein $R^2$ is a $C_1$ to $C_{20}$ alkyl, $C_1$ to $C_{20}$ alkylene, $C_6$ to $C_{22}$ aryl, or a 5-12 membered heteroaryl, wherein the heteroaryl comprises from 1 to 3 ring heteroatoms selected from O, N, and S;
 wherein $R^3$ is a H, $C_1$ to $C_{20}$ alkyl, $C_1$ to $C_{20}$ alkylene, $C_6$ to $C_{22}$ aryl, or a 5-12 membered heteroaryl, wherein the heteroaryl comprises from 1 to 3 ring heteroatoms selected from O, N, and S;

w is from 2 to 2000;

wherein for Formula (I), n is from 0.7 to (v−1); and wherein for Formula (II), n is from 0 to (v−1);

each $R^1$ is independently selected from the group consisting of: a $C_1$ to $C_{30}$ alkyl; a $C_1$ to $C_{30}$ alkylene; a $C_1$ to $C_{30}$ alkyl substituted with a member selected from the group consisting of a halogen, —$OCF_3$, —$NO_2$, —CN, —NC, —OH, —OCN, —NCO, alkoxy, epoxy, amino, mercapto, acryloyl, —$CO_2H$, —C(O)-alkyl, —C(O)O-aryl, and —C(O)O-heteroaryl; and a $C_1$ to $C_{30}$ alkylene substituted with a member selected from the group consisting of a halogen, —$OCF_3$, —$NO_2$, —CN, —NC, —OH, —OCN, —NCO, alkoxy, epoxy, amino, mercapto, acryloyl, —C(O)OH, —C(O)O-alkyl, —C(O)O-aryl, and —C(O)O-heteroaryl; and p is a number that is greater than zero and is up to pmax, wherein $pmax=60/[9*Mw(R^1)+8]$, wherein $Mw(R^1)$ is the molecular weight of the $R^1$ group.

F. A water-soluble unit dose article according to paragraph E wherein the precursor comprises either;

a. at least one compound according to Formula (I), preferably wherein the precursor is free of compounds according to Formula (II); or b. at least one compound according to Formula (II).

G. A water-soluble unit dose article according to paragraphs E-F wherein one of the compounds of Formula (I), Formula (II), or both are characterized by one or more of the following:

(a) a Polystyrene equivalent Weight Average Molecular Weight (Mw) of from about 700 Da to about 30,000 Da;

(b) a degree of branching of 0.2 to about 0.6;

(c) a molecular weight polydispersity index of about 1 to about 20; or (d) a mixture thereof.

H. A water-soluble unit dose article according to paragraphs E-G, wherein for Formula (I), Formula (II), or both, M is silicon.

I. A water-soluble unit dose article according to paragraphs E-H, wherein for Formula (I), Formula (II), or both, Y is OR, wherein R is selected from a methyl group, an ethyl group, a propyl group, or a butyl group, preferably an ethyl group.

J. A water-soluble unit dose article according to any of paragraphs C-I, wherein the inorganic nanoparticles of the first shell component comprise at least one of metal nanoparticles, mineral nanoparticles, metal-oxide nanoparticles or semi-metal oxide nanoparticles or a mixture thereof, preferably wherein the inorganic nanoparticles comprise one or more materials selected from the group consisting of $SiO_2$, $TiO_2$, $Al_2O_3$, $Fe_2O_3$, $Fe_3O_4$, $CaCO_3$, clay, silver, gold, copper or a mixture thereof, more preferably wherein the inorganic nanoparticles comprise one or more materials selected from the group consisting of $SiO_2$, $CaCO_3$, $Al_2O_3$, clay or a mixture thereof K. A water-soluble unit dose article according to any of paragraphs C-J, wherein the inorganic second shell component comprises at least one of $SiO_2$, $TiO_2$, $Al_2O_3$, $CaCO_3$, $Ca_2SiO_4$, $Fe_2O_3$, $Fe_3O_4$, iron, silver, nickel, gold, copper, clay, or a mixture thereof, preferably at least one of $SiO_2$ or $CaCO_3$ or a mixture thereof, more preferably $SiO_2$.

L. A water-soluble unit dose article according to any of paragraphs A-K, wherein the laundry detergent composition comprises the capsules in an amount from 0.05% to 20%, preferably from 0.05% to 10%, more preferably from 0.1% to 5%, most preferably from 0.2% to 3%, by weight of the laundry detergent composition.

M. A water-soluble unit dose article according to any of paragraphs A-L, wherein the laundry detergent composition is a liquid laundry detergent composition comprising between 1% and 20%, preferably between 5% and 15% by weight of the liquid laundry detergent composition of water.

N. A water-soluble unit dose article according to any of paragraphs A-M, wherein the laundry detergent composition comprises non-encapsulated perfume.

O. A water-soluble unit dose article according to any of paragraphs A-N wherein the water-soluble film comprises a polyvinyl alcohol homopolymer or a polyvinyl alcohol copolymer preferably an anionic polyvinyl alcohol copolymer, or a blend of polyvinylalcohol homopolymers and/or polyvinylalcohol copolymers preferably anionic polyvinylalcohol copolymers, more preferably the water-soluble film comprises an anionic polyvinyl alcohol copolymer, even more preferably selected from sulphonated and carboxylated anionic polyvinylalcohol copolymers especially carboxylated anionic polyvinylalcohol copolymers, most preferably the water soluble film comprises a blend of a polyvinylalcohol homopolymer and a carboxylated anionic polyvinylalcohol copolymer.

Test Methods

It is understood that the test methods that are disclosed in the Test Methods Section of the present application should be used to determine the respective values of the parameters of Applicant's claimed subject matter as claimed and described herein.

Method to Determine log P

The value of the log of the Octanol/Water Partition Coefficient (log P) is computed for each PRM in the perfume mixture being tested. The log P of an individual PRM is calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

Mean Shell Thickness Measurement

The capsule shell, including the first shell component and the second shell component, when present, is measured in nanometers on twenty benefit agent containing delivery capsules making use of a Focused Ion Beam Scanning Electron Microscope (FIB-SEM; FEI Helios Nanolab 650) or equivalent. Samples are prepared by diluting a small volume of the liquid capsule dispersion (20 μl) with distilled water (1:10). The suspension is then deposited on an ethanol cleaned aluminium stub and transferred to a carbon coater (Leica EM ACE600 or equivalent). Samples are left to dry under vacuum in the coater (vacuum level: $10^{-5}$ mbar). Next 25-50 nm of carbon is flash deposited onto the sample to deposit a conductive carbon layer onto the surface. The aluminium stubs are then transferred to the FIB-SEM to prepare cross-sections of the capsules. Cross-sections are prepared by ion milling with 2.5 nA emission current at 30 kV accelerating voltage using the cross-section cleaning pattern. Images are acquired at 5.0 kV and 100 pA in immersion mode (dwell time approx. 10 μs) with a magnification of approx. 10,000.

Images are acquired of the fractured shell in cross-sectional view from 20 benefit delivery capsules selected in a random manner which is unbiased by their size, to create a representative sample of the distribution of capsules sizes present. The shell thickness of each of the 20 capsules is measured using the calibrated microscope software at 3 different random locations, by drawing a measurement line perpendicular to the tangent of the outer surface of the capsule shell. The 60 independent thickness measurements are recorded and used to calculate the mean thickness.

Mean and Coefficient of Variation of Volume-Weighted Capsule Diameter

Capsule size distribution is determined via single-particle optical sensing (SPOS), also called optical particle counting (OPC), using the AccuSizer 780 AD instrument or equivalent and the accompanying software CW788 version 1.82 (Particle Sizing Systems, Santa Barbara, California, U.S.A.), or equivalent. The instrument is configured with the following conditions and selections: Flow Rate=1 mL/sec; Lower Size Threshold=0.50 μm; Sensor Model Number=LE400-05SE or equivalent; Auto-dilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at most 9200 per mL. During a time period of 60 seconds the suspension is analyzed. The range of size used was from 1 μm to 493.3 μm.

Volume Distribution:

$$CoVv\ (\%) = \frac{\sigma_v}{\mu_v} * 100$$

$$\sigma v = \sum_{i=1\ um}^{493.3\ um} (x_{i,v} * (d_i - \mu_v)^2)0.5$$

$$\mu_v = \frac{\sum_{i=1\ um}^{493.3\ um} (x_{i,v} * d_i)}{\sum_{i=1\ um}^{493.3\ um} x_{i,v}}$$

where:

$CoV_v$—Coefficient of variation of the volume weighted size distribution $\sigma_v$—Standard deviation of volume-weighted size distribution $\mu_v$—mean of volume-weighted size distribution $d_i$—diameter in fraction i $x_{i,v}$—frequency in fraction i (corresponding to diameter i) of volume-weighted size distribution $$x_{i,v} = \frac{x_{i,n} * d_i^3}{\sum_{i=1\ um}^{493.3\ um} (x_{i,n} * d_i^3)}$$

Volumetric Core-Shell Ratio Evaluation

The volumetric core-shell ratio values are determined as follows, which relies upon the mean shell thickness as measured by the Shell Thickness Test Method. The volumetric core-shell ratio of capsules where their mean shell thickness was measured is calculated by the following equation:

$$\frac{\text{Core}}{\text{Shell}} = \frac{\left(1 - \frac{2 * \text{Thickness}}{D_{caps}}\right)^3}{\left(1 - \left(1 - \frac{2 * \text{Thickness}}{D_{caps}}\right)^3\right)}$$

wherein Thickness is the mean shell thickness of a population of capsules measured by FIBSEM and the $D_{caps}$ is the mean volume weighted diameter of the population of capsules measured by optical particle counting.

This ratio can be translated to fractional core-shell ratio values by calculating the core weight percentage using the following equation:

$$\%\ \text{Core} = \left(\frac{\frac{\text{Core}}{\text{Shell}}}{1 + \frac{\text{Core}}{\text{Shell}}}\right) * 100$$

and shell percentage can be calculated based on the following equation:

% Shell=100−% Core.

Degree of Branching Method

The degree of branching of the precursors was determined as follows: Degree of branching is measured using (29Si) Nuclear Magnetic Resonance Spectroscopy (NMR).

Sample Preparation

Each sample is diluted to a 25% solution using deuterated benzene (Benzene-D6 "100%" (D, 99.96% available from Cambridge Isotope Laboratories Inc., Tewksbury, MA, or equivalent). 0.015M Chromium(III) acetylacetonate (99.99% purity, available from Sigma-Aldrich, St. Louis, MO, or equivalent) is added as a paramagnetic relaxation reagent. If glass NMR tubes (Wilmed-LabGlass, Vineland, NJ or equivalent) are used for analysis, a blank sample must also be prepared by filling an NMR tube with the same type of deuterated solvent used to dissolve the samples. The same glass tube must be used to analyze the blank and the sample.

Sample Analysis

The degree of branching is determined using a Bruker 400 MHz Nuclear Magnetic Resonance Spectroscopy (NMR) instrument, or equivalent. A standard silicon (29Si) method (e.g. from Bruker) is used with default parameter settings with a minimum of 1000 scans and a relaxation time of 30 seconds.

Sample Processing

The samples are stored and processed using system software appropriate for NMR spectroscopy such as MestReNova version 12.0.4-22023 (available from Mestrelab Research) or equivalent. Phase adjusting and background correction are applied. There is a large, broad, signal present that stretches from −70 to −136 ppm which is the result of using glass NMR tubes as well as glass present in the probe housing. This signal is suppressed by subtracting the spectra of the blank sample from the spectra of the synthesized sample provided that the same tube and the same method parameters are used to analyze the blank and the sample. To further account for any slight differences in data collection, tubes, etc., an area outside of the peaks of interest area should be integrated and normalized to a consistent value. For example, integrate −117 to −115 ppm and set the integration value to 4 for all blanks and samples.

The resulting spectra produces a maximum of five main peak areas. The first peak (Q0) corresponds to unreacted TAOS. The second set of peaks (Q1) corresponds to end groups. The next set of peaks (Q2) correspond to linear groups. The next set of broad peaks (Q3) are semi-dendritic units. The last set of broad peaks (Q4) are dendritic units. When PAOS and PBOS are analyzed, each group falls within a defined ppm range. Representative ranges are described in the following table:

| Group ID | # of Bridging Oxygen per Silicon | ppm Range |
|---|---|---|
| Q0 | 0 | −80 to −84 |
| Q1 | 1 | −88 to −91 |
| Q2 | 2 | −93 to −98 |
| Q3 | 3 | −100 to −106 |
| Q4 | 4 | −108 to −115 |

Polymethoxysilane has a different chemical shift for Q0 and Q1, an overlapping signal for Q2, and an unchanged Q3 and Q4 as noted in the table below:

| Group ID | # of Bridging Oxygen per Silicon | ppm Range |
|---|---|---|
| Q0 | 0 | −78 to −80 |
| Q1 | 1 | −85 to −88 |
| Q2 | 2 | −91 to −96 |
| Q3 | 3 | −100 to −106 |
| Q4 | 4 | −108 to −115 |

The ppm ranges indicated in the tables above may not apply to all monomers. Other monomers may cause altered chemical shifts, however, proper assignment of Q0-Q4 should not be affected. Using MestReNova, each group of peaks is integrated, and the degree of branching can be calculated by the following equation:

$$\text{Degree of Branching} = (1/4) * \frac{3 * Q3 + 4 * Q4}{Q1 + Q2 + Q3 + Q4}$$

Molecular Weight and Polydispersity Index Determination Method

The molecular weight (Polystyrene equivalent Weight Average Molecular Weight (Mw)) and polydispersity index (Mw/Mn) of the condensed layer precursors described herein are determined using Size Exclusion Chromatography with Refractive Index detection. Mn is the number average molecular weight.

Sample Preparation

Samples are weighed and then diluted with the solvent used in the instrument system to a targeted concentration of 10 mg/mL. For example, weigh 50 mg of polyalkoxysilane into a 5 mL volumetric flask, dissolve and dilute to volume with toluene. After the sample has dissolved in the solvent, it is passed through a 0.45 um nylon filter and loaded into the instrument autosampler.

Sample Analysis

An HPLC system with autosampler (e.g. Waters 2695 HPLC Separation Module, Waters Corporation, Milford MA, or equivalent) connected to a refractive index detector (e.g. Wyatt 2414 refractive index detector, Santa Barbara, CA, or equivalent) is used for polymer analysis. Separation is performed on three columns, each 7.8 mm I.D.×300 mm in length, packed with 5 μm polystyrene-divinylbenzene media, connected in series, which have molecular weight cutoffs of 1, 10, and 60 kDA, respectively. Suitable columns are the TSKGel G1000HHR, G2000HHR, and G3000HHR columns (available from TOSOH Bioscience, King of Prussia, PA) or equivalent. A 6 mm I.D.×40 mm long 5 μm polystyrene-divinylbenzene guard column (e.g. TSKgel Guardcolumn HHR-L, TOSOH Bioscience, or equivalent) is used to protect the analytical columns. Toluene (HPLC grade or equivalent) is pumped isocratically at 1.0 mL/min, with both the column and detector maintained at 25° C. 100 μL of the prepared sample is injected for analysis. The sample data is stored and processed using software with GPC calculation capability (e.g. ASTRA Version 6.1.7.17 software, available from Wyatt Technologies, Santa Barbara, CA or equivalent.)

The system is calibrated using ten or more narrowly dispersed polystyrene standards (e.g. Standard ReadyCal Set, (e.g. Sigma Aldrich, PN 76552, or equivalent) that have known molecular weights, ranging from about 0.250-70 kDa and using a third order fit for the Mp verses Retention Time Curve.

Using the system software, calculate and report Weight Average Molecular Weight (Mw) and PolyDispersity Index (Mw/Mn).

Method of Calculating Organic Content in First Shell Component

As used herein, the definition of organic moiety in the inorganic shell of the capsules according to the present disclosure is: any moiety X that cannot be cleaved from a metal precursor bearing a metal M (where M belongs to the group of metals and semi-metals, and X belongs to the group of non-metals) via hydrolysis of the M-X bond linking said moiety to the inorganic precursor of metal or semi-metal M and under specific reaction conditions, will be considered as organic. A minimal degree of hydrolysis of 1% when exposed to neutral pH distilled water for a duration of 24 h without stirring, is set as the reaction conditions.

This method allows one to calculate a theoretical organic content assuming full conversion of all hydrolysable groups. As such, it allows one to assess a theoretical percentage of organic for any mixture of silanes and the result is only indicative of this precursor mixture itself, not the actual organic content in the first shell component. Therefore, when a certain percentage of organic content for the first shell component is disclosed anywhere in this document, it is to be understood as containing any mixture of unhydrolyzed or pre-polymerized precursors that according to the below calculations give a theoretical organic content below the disclosed number.

Example for Silane (but not Limited Thereto; See Generic Formula at the End of this Section):

Consider a mixture of silanes, with a molar fraction $Y_i$ for each, and where i is an ID number for each silane. Said mixture can be represented as follows:

$$Si(XR)_{4-n}R_n$$

where XR is a hydrolysable group under conditions mentioned in the definition above, $R^i_{ni}$ is non-hydrolyzable under conditions mentioned above and $n_i$=0, 1, 2 or 3.

Such a mixture of silanes will lead to a shell with the following general formula:

$$SiO\frac{(4-n)}{2}R_n$$

Then, the weight percentage of organic moieties as defined earlier can be calculated as follows:

1) Find out Molar fraction of each precursor (nanoparticles included)

2) Determine general formula for each precursor (nanoparticles included)

3) Calculate general formula of precursor and nanoparticle mixture based on molar fractions 4) Transform into reacted silane (all hydrolysable groups to oxygen groups)

5) Calculate weight ratio of organic moieties vs. total mass (assuming 1 mole of Si for framework)

Example

| Raw material | Formula | Mw (g/mol) | weight (g) | amount (mmol) | Molar fraction |
|---|---|---|---|---|---|
| Sample AY | $SiO(OEt)_2$ | 134 | 1 | 7.46 | 0.57 |
| TEOS | $Si(OEt)_4$ | 208 | 0.2 | 0.96 | 0.07 |
| DEDMS | $Si(OEt)_2Me_2$ | 148.27 | 0.2 | 1.35 | 0.10 |
| SiO2 NP | $SiO_2$ | 60 | 0.2 | 3.33 | 0.25 |

To calculate the general formula for the mixture, each atoms index in the individual formulas is to be multiplied by their respective molar fractions. Then, for the mixture, a sum of the fractionated indexes is to be taken when similar ones occur (typically for ethoxy groups).

Note: Sum of all Si fractions will always add to 1 in the mixture general formula, by virtue of the calculation method (sum of all molar fractions for Si yields 1).

$$SiO_{1*0.57+2*0.25}(OEt)_{2*0.57+4*0.07+2*0.10}Me_{2*0.10}$$

$$SiO_{1.07}(OEt)_{1.62}Me_{0.20}$$

To transform the unreacted formula to a reacted one, simply divide the index of ALL hydrolysable groups by 2, and then add them together (with any pre-existing oxygen groups if applicable) to obtain the fully reacted silane.

$$SiO_{1.88}Me_{0.20}$$

In this case, the expected result is $SiO_{1.9}Me_{0.2}$, as the sum of all indexes must follow the following formula:

$$A+B/2=2,$$

where A is the oxygen atom index and B is the sum of all non-hydrolysable indexes. The small error occurs from rounding up during calculations and should be corrected. The index on the oxygen atom is then readjusted to satisfy this formula.

Therefore, the final formula is $SiO_{1.9}Me_{0.2}$, and the weight ratio of organic is calculated below:

$$\text{Weight ratio}=(0.20*15)/(28+1.9*16+0.20*15)=4.9\%$$

General Case:

The above formulas can be generalized by considering the valency of the metal or semi-metal M, thus giving the following modified formulas:

$$M(XR)_{V-ni}R^i_{ni}$$

and using a similar method but considering the valency V for the respective metal.

EXAMPLES

The impact of presence versus absence of a polyvinyl alcohol water-soluble film on wet fabric perfume head space performance (in nmol/L) over cotton and polyester fabrics was assessed for a liquid laundry detergent composition, suitable for use in water soluble unit dose articles, comprising silica shell based perfume capsules according to the invention, and was compared against the impact for the same liquid laundry detergent composition but single variably comprising polyacrylate shell based perfume capsules outside the scope of the invention, following the test method described herein.

Starting Materials:

Liquid Detergent Composition

Liquid detergent compositions having the formulations provided in Table 1 were prepared at lab scale by normal mixing of the individual starting materials at room temperature under a batch-type process. Inventive Example 1 comprises silica shell based perfume capsules according to the invention, while Comparative Example 1 comprises polyacrylate shell based perfume capsules outside the scope of the invention.

TABLE 1

Liquid detergent composition

| Ingredients (All levels are in weight percent of the composition.) | Inventive Example 1 | Comparative Example 1 |
|---|---|---|
| HLAS | 26.5 | 26.5 |
| C12-C14 AE3S | 7.7 | 7.7 |
| C12-18 Fatty Acid | 8.9 | 8.9 |
| C12-14 Alcohol Ethoxylate 7EO | 1.5 | 1.5 |
| Citric acid | 0.7 | 0.7 |
| Protease Enzyme | 0.05 | 0.05 |
| Amylase Enzyme | 0.01 | 0.01 |
| Zwitterionic polyamine (1) | 1.5 | 1.5 |
| Ethoxylated Polyethylene Imine (PEI 600 EO20) | 1.5 | 1.5 |
| HEDP | 0.7 | 0.7 |
| Brightener agent (FWA 49) | 0.3 | 0.3 |
| Silicone suds suppressor | 0.3 | 0.3 |
| 1,2 propanediol | 13.4 | 13.4 |
| Glycerine | 4.9 | 4.9 |
| MEA | 8.0 | 8.0 |
| K2SO3 | 0.1 | 0.1 |
| MgCl2 | 0.13 | 0.13 |
| Hydrogenated Castor Oil | 0.15 | 0.15 |
| Silica shell based perfume capsules (2) (3) | 1.8 | — |
| Polyacrylate shell based perfume capsules (2) (3) | — | 1.8 |
| Water & Minors | Add to 100 | Add to 100 |

(1) Lutensit Z96: Zwitterionic ethoxylated quaternized sulfated hexamethylene diamine, from BASF
(2) details: see perfumes capsules section below
(3) as % encapsulated perfume Perfume Capsules The two types of perfume capsules added to the respective liquid detergent compositions ex Table 1, were synthesized according to the synthesis routes described below.

Silica Shell Based Perfume Capsules

The oil phase is prepared by mixing and homogenizing (or even dissolving if all compounds are miscible) a non-hydrolytic precursor with a perfume composition (one part of non-hydrolytic precursor to two parts of perfume composition). The water phase is prepared by adding 1.25 w % Aerosil 300 (available from Evonik) in a 0.1M HCl aqueous solution, dispersed with an ultrasound bath for at least 30 minutes. Once each phase is prepared separately, they are combined (one part of oil phase to four parts of water), and the oil phase is dispersed into the water phase with IKA ultraturrax S25N-10G mixing tool at 13400 RPM per 1 minute. Once the emulsification step is complete, the resulting emulsion is cured with the following temperature profile: 4 h at 22° C., 16 h at 50° C. and 96 h at 70° C. In order to deposit a second shell component, the capsules receive a post-treatment with a second shell component solution: the slurry is diluted 2 times in 0.1M HCl and treated with a controlled addition (40 μl per minute, 0.16 ml per g of slurry) of a 10 wt % sodium silicate aqueous solution, using a suspended magnetic stirrer reactor at 250 RPM, at 22° C. The pH is kept constant at pH 7 using a 1M HCl(aq). After the infusion of the second shell component solution finishes, the capsules are centrifuged for 10 minutes at 2500 RPM and re-dispersed in de-ionized water. The resulting capsules comprise a silica-based first shell component and a second shell component, according to the present disclosure, the mean size is 29.22 μm and the CoV 38%.

Non-Hydrolytic Precursor Synthesis 1000 g of tetraethoxysilane (TEOS, available from Sigma Aldrich) is added to a clean dry round bottom flask equipped with a stir bar and distillation apparatus under nitrogen atmosphere. 490 ml of acetic anhydride (available from Sigma Aldrich) and 5.8 g of Tetrakis(trimethylsiloxy)titanium (available from Gelest) is added and the contents of the flask are stirred for 28 hours at 135° C. During this time, the ethyl acetate generated by reaction of the ethoxy silane groups with acetic anhydride is distilled off. The reaction flask is cooled to room temperature and is placed on a rotary evaporator (Buchi Rotovapor R110), used in conjunction with a water bath and vacuum pump (Welch 1402 DuoSeal) to remove any remaining solvent and volatile compounds. The polyethoxysilane (PEOS) generated is a yellow viscous liquid with the following specifications found in Table 2. The ratio of TEOS to acetic anhydride can be varied to control the parameters presented in Table 2.

TABLE 2

| Parameters of PEOS | Results |
|---|---|
| Degree of branching (DB) | 0.26 |
| Molecular weight (Mw) | 1.2 |
| Polydispersity index (PDI) | 3.9 |

Polyacrylate Shell Based Perfume Capsules

A population of perfume capsules comprising a polyacrylate shell, encapsulating the same perfume composition as the silica shell based perfume capsules above, was prepared according to encapsulates made according to the processes disclosed in US Publication No. 2011/0268802

Polyvinyl Alcohol Film

The polyvinyl alcohol used was a polyvinylalcohol homopolymer/anionic polyvinylalcohol copolymer blend, as received from the MonoSol company and used in Ariel 3-in-1 Pods, as commercially available in the UK in July 2020.

Wet Fabric Perfume Head Space Performance Test Method:

The Inventive and Comparative Example compositions ex Table 1 were tested for wet fabric perfume head space performance, both in presence as in absence of the polyvinyl alcohol based film. Washed fabrics were analyzed at the wet stage with a GCMS to yield Wet Fabric Headspace (WFHS) for individual perfume raw materials.

Preparation of Fabric Samples

The method of treating a fabric includes the use of a commercial washing machine, such as a Miele Honeycomb Care W1724, or other similar machine using standard machine settings (cotton short cycle program at 40° C., 1200 RPM for 1 hr 14 min using water with 2.5 mmol/L hardness). The fabric composition in the washing machine consists of terry cotton and polyester test fabrics and a standard ballast load consisting of a mixture of polycotton and cotton, totaling 3 kilograms. The water soluble polyvinyl alcohol polymer and detergent treatments are delivered to the drum of the machine at the designated level: 22.6 g detergent composition, with and without the water-soluble polyvinyl alcohol film, the water soluble polyvinyl alcohol film (0.03 g) being dosed as an empty 3 compartment unit dose article resembling FIG. 1, e.g. resembling the unit dose article design as commercially available in the UK in July 2020)

Headspace Analysis

Wet fabric tracers were subjected immediately following the washing cycle to a perfume headspace analysis. 6 replicates of each type of tracer per wash test were analyzed by fast headspace GC/MS. 4×4 cm aliquots of the fabric tracers were transferred to 25 mL headspace vials. The fabric samples were equilibrated for 10 minutes at 65° C. The headspace above the fabrics was sampled via SPME (50/30 μm DVB/Carboxen/PDMS) approach for 5 minutes. The SPME fibre was subsequently on-line thermally desorbed into the GC. The analytes were analyzed by fast GC/MS in full scan mode. Ion extraction of the specific masses of the perfume raw materials were used to calculate the total headspace response (expressed in nmol/l) above the tested legs.

Test Results

Table 3 summarizes the total perfume headspace response over wet terry cotton tracers as well as the single variable headspace loss/gain effect of polyvinylalcohol addition, for silica shell capsules according to the invention and polyacrylate shell capsules outside the scope of the invention. Table 4 summarizes the total headspace response over wet polyester fabric tracers as well as the single variable headspace loss/gain effect of polyvinylalcohol addition, for silica shell capsules according to the invention and polyacrylate shell capsules outside the scope of the invention.

The data clearly show the positive perfume headspace impact of polyvinylalcohol film on terry cotton fabric tracer head space when combined with silica shell capsules (+56% Total Headspace), while showing a negative impact of polyvinylalcohol film when combined with polyacrylate shell capsules (−16% Total Headspace). On polyester fabric tracers a neutral impact of polyvinylalcohol film has been found when combined with silica shell capsules (+1% Total Headspace), while again a negative impact of polyvinylalcohol film is observed when combined with polyacrylate shell capsules (−23% Total Headspace). As a net result, while silica based perfume capsules according to the invention are intrinsically lower performing in view of wet stage perfume headspace compared to polyacrylate based perfume capsules, due to the surprising opposite synergistic polyvinyl alcohol wet stage perfume headspace impact, this intrinsical wet stage perfume headspace performance gap has been significantly reduced when formulating these perfume capsules according to the invention within a water soluble polyvinyl alcohol film comprising unit dose article (−27% versus −61% on cotton, −8% versus −31% on polyester).

TABLE 3

Total Wet Fabric HeadSpace (in nmol/L) on cotton fabric.

| Examples | Description | Total HS (nmol/L) | Impact of PVA film | Impact of capsule type |
|---|---|---|---|---|
| Comparative 1 | Silica Shell | 116.4 | SILICA REF | −61% |
| Inventive 1 | Silica Shell + PVA film | 181.1 | +56% | −27% |
| Comparative 2 | Polyacrylate Shell (PAC) | 295.3 | PAC REF | Nil PVA REF |
| Comparative 3 | Polyacrylate Shell + PVA film | 248.6 | −16% | With PVA REF |

TABLE 4

Total Wet Fabric HeadSpace (in nmol/L) on polyester fabric.

| Examples | Description | Total HS (nmol/L) | Impact of PVA film | Impact of capsule type |
|---|---|---|---|---|
| Comparative 1 | Silica Shell | 86.9 | REF | −31% |
| Inventive 1 | Silica Shell + PVA | 88.2 | +1% | −8% |
| Comparative 2 | Polyacrylate Shell | 125.2 | REF | Nil PVA REF |
| Comparative 3 | Polyacrylate Shell + PVA | 96.0 | −23% | With PVA REF |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble unit dose article, wherein the water-soluble unit dose article comprises a water-soluble polyvinyl alcohol film and a laundry detergent composition, wherein the water-soluble film encloses the laundry detergent composition, wherein the laundry detergent composition comprises capsules, wherein the capsules have a core and a shell and wherein the shell surrounds the core;

wherein the core comprises a hydrophobic material;

wherein the shell comprises (a) a first shell component comprising a condensed layer and a nanoparticle layer, where the condensed layer comprises a condensation product of a precursor, and where the nanoparticle layer comprises inorganic nanoparticles, and where the condensed layer is disposed between the core and the nanoparticle layer, and (b) a second shell component surrounding the first shell component, where the second shell component surrounds the nanoparticle layer;

wherein the shell comprises between about 90% and about 100%, by weight of the shell of an inorganic material; and wherein the capsules have a fracture strength between 1 MPa and 10 MPa.

2. A water-soluble unit dose article according to claim 1, wherein the hydrophobic material comprises at least one perfume raw material.

3. A water-soluble unit dose article according to claim 1 wherein the inorganic material in the shell comprises a material selected from metal oxide, semi-metal oxides, metals, minerals or mixtures thereof.

4. A water-soluble unit dose article according to claim 3, wherein the inorganic material in the shell comprises a material selected from $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, copper or a mixture thereof.

5. A water-soluble unit dose article according to claim 1, wherein the capsules are characterized by one or more of the following:

(a) a mean volume weighted capsule diameter of about 10 μm to about 200 μm;

(b) an average shell thickness of about 170 nm to about 1000 nm;

(c) a volumetric core/shell ratio of from about 50:50 to about 99:1;

(d) the first shell component comprises no more than about 5 wt %, of organic content, by weight of the first shell component; or (e) a mixture thereof.

6. A water-soluble unit dose article according to claim 1 wherein the precursor comprises at least one compound selected from the group consisting of Formula (I), Formula (II), or a mixture thereof, wherein Formula (I) is $(M^vO_zY_n)_w$, wherein Formula (II) is $(M^vO_zY_nR^1_p)_w$, wherein for Formula (I), Formula (II), or the mixture thereof:

each M is independently selected from the group consisting of silicon, titanium, and aluminum, v is the valence number of M and is about 3 or about 4, z is from about 0.5 to about 1.6, each Y is independently selected from —OH, —$OR^2$, halogen,

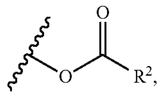

—$NH_2$, —$NHR^2$, —$N(R^2)_2$, and

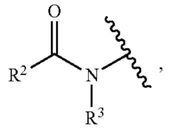

wherein $R^2$ is a $C_1$ to $C_{20}$ alkyl, $C_1$ to $C_{20}$ alkylene, $C_6$ to $C_{22}$ aryl, or a 5-12 membered heteroaryl, wherein the heteroaryl comprises from 1 to 3 ring heteroatoms selected from O, N, and S;

wherein $R^3$ is a H, $C_1$ to $C_{20}$ alkyl, $C_1$ to $C_{20}$ alkylene, $C_6$ to $C_{22}$ aryl, or a 5-12 membered heteroaryl, wherein the heteroaryl comprises from 1 to 3 ring heteroatoms selected from O, N, and S;

w is from about 2 to about 2000;

wherein for Formula (I), n is from 0.7 to (v−1); and wherein for Formula (II), n is from 0 to (v−1);

each $R^1$ is independently selected from the group consisting of: a $C_1$ to $C_{30}$ alkyl; a $C_1$ to $C_{30}$ alkylene; a $C_1$ to $C_{30}$ alkyl substituted with a member selected from the group consisting of a halogen, —$OCF_3$, —$NO_2$, —CN, —NC, —OH, —OCN, —NCO, alkoxy, epoxy, amino, mercapto, acryloyl, —$CO_2H$, —C(O)-alkyl, —C(O)O-aryl, and —C(O)O-heteroaryl; and a $C_1$ to $C_{30}$ alkylene substituted with a member selected from the group consisting of a halogen, —$OCF_3$, —$NO_2$, —CN, —NC, —OH, —OCN, —NCO, alkoxy, epoxy, amino, mercapto, acryloyl, —C(O)OH, —C(O)O-alkyl, —C(O)O-aryl, and —C(O)O-heteroaryl; and p is a number that is greater than zero and is up to pmax, wherein pmax=60/[9*Mw($R^1$)+8], wherein Mw($R^1$) is the molecular weight of the $R^1$ group.

7. A water-soluble unit dose article according to claim 6 wherein the precursor comprises either;

a. at least one compound according to Formula (I); or b. at least one compound according to Formula (II).

8. A water-soluble unit dose article according to claim 6 wherein one of the compounds of Formula (I), Formula (II), or both are characterized by one or more of the following:

(a) a Polystyrene equivalent Weight Average Molecular Weight (Mw) of from about 700 Da to about 30,000 Da;

(b) a degree of branching of about 0.2 to about 0.6;

(c) a molecular weight polydispersity index of about 1 to about 20; or (d) a mixture thereof.

9. A water-soluble unit dose article according to claim 6, wherein for Formula (I), Formula (II), or both, M is silicon.

10. A water-soluble unit dose article according to claim 6, wherein for Formula (I), Formula (II), or both, Y is OR, wherein R is selected from a methyl group, an ethyl group, a propyl group, or a butyl group.

11. A water-soluble unit dose article according to claim 1, wherein the inorganic nanoparticles of the first shell component comprise at least one of metal nanoparticles, mineral nanoparticles, metal-oxide nanoparticles or semi-metal oxide nanoparticles or a mixture thereof.

12. A water-soluble unit dose article according to claim 11, wherein the inorganic nanoparticles comprise one or more materials selected from the group consisting of $SiO_2$, $TiO_2$, $Al_2O_3$, $Fe_2O_3$, $Fe_3O_4$, $CaCO_3$, clay, silver, gold, copper or a mixture thereof.

13. A water-soluble unit dose article according to claim 1, wherein the second shell component comprises at least one of $SiO_2$, $TiO_2$, $Al_2O_3$, $CaCO_3$, $Ca_2SiO_4$, $Fe_2O_3$, $Fe_3O_4$, iron, silver, nickel, gold, copper, clay, or a mixture thereof.

14. A water-soluble unit dose article according to claim 1, wherein the laundry detergent composition comprises the capsules in an amount from about 0.05% to about 20% by weight of the laundry detergent composition.

15. A water-soluble unit dose article according to claim 1, wherein the laundry detergent composition is a liquid laundry detergent composition comprising between about 1% and about 20%, by weight of the liquid laundry detergent composition of water.

16. A water-soluble unit dose article according to claim 1, wherein the laundry detergent composition comprises non-encapsulated perfume.

17. A water-soluble unit dose article according to claim 1 wherein the water-soluble film comprises a polyvinylalcohol homopolymer, a polyvinylalcohol copolymer, or a blend thereof.

18. A water-soluble unit dose article according to claim 17, wherein the water-soluble film comprises a blend of polyvinylalcohol homopolymers and/or anionic polyvinylalcohol copolymers.

19. A water-soluble unit dose article according to claim 18, wherein the water-soluble film wherein the water-soluble film comprises a blend of a polyvinylalcohol homopolymer and a carboxylated anionic polyvinylalcohol copolymer.

* * * * *